(12) United States Patent
Matsui

(10) Patent No.: US 6,973,195 B1
(45) Date of Patent: Dec. 6, 2005

(54) METHOD FOR EMBEDDING ELECTRONIC WATERMARK AND METHOD FOR DECODING THE SAME

(75) Inventor: Kineo Matsui, Yokosuka (JP)

(73) Assignee: Kowa Co., Ltd., Nagoya (JP)

(*) Notice: Subject to any disclaimer, the term of this patent is extended or adjusted under 35 U.S.C. 154(b) by 0 days.

(21) Appl. No.: 09/830,236

(22) PCT Filed: Oct. 26, 1999

(86) PCT No.: PCT/JP99/05924

§ 371 (c)(1),
(2), (4) Date: Jul. 16, 2001

(87) PCT Pub. No.: WO00/25510

PCT Pub. Date: May 4, 2000

(30) Foreign Application Priority Data

Oct. 27, 1998 (JP) .................................. 10-322900

(51) Int. Cl.$^7$ ............................................. G06K 9/00
(52) U.S. Cl. ...................................... 382/100; 382/232
(58) Field of Search ........................................ 382/100

(56) References Cited

U.S. PATENT DOCUMENTS

| | | | |
|---|---|---|---|
| 5,617,119 A | 4/1997 | Briggs et al. | |
| 5,861,963 A | 1/1999 | Tsuji | 358/530 |
| 6,463,162 B1 * | 10/2002 | Vora | 382/100 |
| 6,591,009 B1 * | 7/2003 | Usami et al. | 382/165 |
| 6,640,005 B1 * | 10/2003 | Westerman et al. | 382/166 |

FOREIGN PATENT DOCUMENTS

| | | |
|---|---|---|
| JP | 7-273973 | 10/1995 |
| JP | 9-191394 | 7/1997 |
| JP | 10-313402 | 11/1998 |
| JP | 11-88662 | 3/1999 |
| WO | WO99/36876 | 7/1999 |

* cited by examiner

Primary Examiner—Brian Werner
Assistant Examiner—Christopher Lavin
(74) Attorney, Agent, or Firm—Beyer Weaver & Thomas LLP

(57) ABSTRACT

The present invention applies a technique, which is characteristic of color images, to embed a digital watermark in a color image and decode the embedded digital watermark. The technique adjusts a color signal transformation matrix by adding or subtracting a digital watermark matrix to or from the color signal transformation matrix in the process of transforming image data of an original color image in an RGB colorimetric system into image data in a YCbCr colorimetric system with the color signal transformation matrix. The digital watermark matrix includes an arbitrary numerical value of real number x, which represents digital watermark information, as an entry thereof and satisfies a condition that a sum of respective entries in each row and in each column is all substantially equal to zero. The technique inversely transforms the image data, which is obtained by the transformation with the adjusted color signal transformation matrix, into the image data in the RGB calorimetric system by means of an inverse color signal transformation matrix. The inversely transformed image has the numerical value of real-number x embedded therein as the digital watermark. The numerical value of real number x is decoded from transformed image data, which is obtained by transforming the original image into color signals in the YCbCr colorimetric system.

8 Claims, 8 Drawing Sheets x = 0.1 x = 0.05 x = -0.1 x = -0.05 x = 0.1 x = 0.05 x = -0.1 x = -0.05 clipped image 1 clipped image 2 clipped image 3

80% JPEG image

60% JPEG image

40% JPEG image

METHOD FOR EMBEDDING ELECTRONIC WATERMARK AND METHOD FOR DECODING THE SAME

TECHNICAL FIELD

The present invention relates to a method of embedding a digital watermark to prevent unauthorized copies of an original color image as well as a method of decoding the embedded digital watermark.

BACKGROUND ART

Advanced computer networks like the Internet accelerate digitalization of information and allow a large number of users to access required information readily. Such advanced environment, on the other hand, causes digital contents including digital information with the copyright to be readily duplicated as unauthorized copies without permission of copyright holders. Infringement of the copyright due to the illegal copies is becoming a significant problem. In order to prevent infringement against copyrighted color images, which are the main part of digital information in digital contents, the digital watermarking technique draws heightened attention. The digital watermarking technique embeds the copyright information in data of an original color image in a secret and unnoticeable manner to any third person and extracts the copyright information from the embedded original color image according to the requirements.

A large number of technical suggestions have been made for digital watermarking of monochromatic images. The luminance signal (the Y signal) of a color image can be processed like the monochromatic image. The prior art technique accordingly embeds the digital watermark in the luminance signal of the color image corresponding to the monochromatic image.

There have been no proposed techniques that embed a digital watermark by utilizing signals and data intrinsic to color images. The proposed digital watermark embedding techniques are described in 'Deep-layered Information Recording in Color Images' that utilizes the color space of a color printer (the Institute of Image Electronics Engineers of Japan, the Proceedings of Annual Conference 7, 20, pp. 47–48), 'One Technique of Color Watermarking by Taking into Account Visual Characteristics' that is constructed as a model taking advantage of visual characteristics (IMPS 97, I-3.14, pp. 45–46 (1997)), and 'One Technique of Embedding Digital Watermark in Digital Image' (SITA97, Vol. 2, pp. 541–544 (1997)). These prior art techniques, however, have drawbacks such that the model and the digital watermark embedding process are rather complicated. It has also been pointed out that the method of embedding the digital watermark in lower bits of the color image undesirably deteriorates the picture quality of the resulting color image.

The object of the present invention is thus to provide an improved method of embedding and decoding a digital watermark. Such an improved method takes advantage of characteristics intrinsic to color images, readily and securely embeds a digital watermark into an original image without deteriorating the original image, and effectively maintains the digital watermark intact without being affected by clipping, JPEG compression, and other series of digital processing.

DISCLOSURE OF THE INVENTION

The present invention is directed to a method of embedding digital watermark information in a color image. The method includes the steps of: providing a color signal transformation matrix and an inverse color signal transformation matrix, the color signal transformation matrix transforming image data in a first colorimetric system, which expresses a predetermined color space by a combination of plural parameters, into image data in a second colorimetric system, which expresses the predetermined color space by a combination of other plural parameters, the inverse color signal transformation matrix carrying out inverse of the transformation; adjusting the color signal transformation matrix by either of adding and subtracting a digital watermark matrix to and from the color signal transformation matrix, the digital watermark matrix including an arbitrary numerical value of real number x, which represents the digital watermark information, as an entry thereof and satisfying a condition that a sum of respective entries in each row and in each column is all substantially equal to zero; transforming the image data in the first calorimetric system into image data in the second colormetric system with the adjusted color signal transformation matrix; and inversely transforming the resulting image data in the second calorimetric system, which is obtained by the transformation, into the image data in the first colorimetric system with the inverse color signal transformation matrix, so as to embed the digital watermark information into the color image.

There are a variety of known colorimetric systems that express a predetermined color space by a combination of plural parameters. A transformation matrix and an inverse transformation matrix are defined between each pair of different calorimetric systems. The technique of the present invention uses a color signal transformation matrix and an inverse color signal transformation matrix for the simple arithmetic operations discussed above and thereby embeds the digital watermark in each pixel while preventing deterioration of an original color image. The embedded digital watermark has a high resistance against clipping of an image, compression, and other series of digital processing.

Here an RGB colorimetric system using three primary colors of light as parameters and a YCbCr calorimetric system using a luminance signal and color difference signals as parameters may be applied appropriately for either of the first colorimetric system and the second calorimetric system. These calorimetric systems are often used for image data processing, and transformation matrices between these colorimetric systems are well known. There are accordingly a large number of retouching software for processing the image data in these colorimetric systems. These factors facilitate the process of embedding the digital watermark.

The arbitrary numerical value of real number x may be an arbitrary value in a range of not less than −0.1 and not greater than 0.1. This restricts the effects on each entry of the color signal transformation matrix and thereby relieves the influence on the original color image. Such limitation of the numerical value of real number may reduce the effects on the original color image to be lower than the range of general visual recognition of human eyes.

In accordance with one preferable application, the embedding method further includes the step of: carrying out underflow correction or overflow correction to cause an arbitrary pixel value to be an integer within a predetermined range in the process of inversely transforming the digital information in the YCbCr colorimetric system, that is, the luminance signal and the color difference signals, which is obtained by the transformation with the digital watermark matrix, into the color signals in the RGB colorimetric system, that is, the three primary color signals of light, by means of the inverse color signal transformation matrix. Since the watermark information is added to the original image data, inverse transformation of the transformed luminance signal and color difference signals may cause the resulting image data to be out of the range of the original image data. The underflow correction or the overflow correction corrects the underflow or the overflow and causes the resulting image data, which has undergone the inverse transformation, to be within the allowable range of the original image data. For example, it is assumed that the original image is specified by 8-bit data with regard to each color R, G, and B and 256 tones in the range of 0 to 255 is expressible with regard to each color. When the resulting value obtained by the inverse transformation is negative, the underflow correction is carried out to set the value '0' to the resulting value. When the resulting value exceeds 255, the overflow correction is carried out to set the value '255' to the resulting value.

The present invention is also directed to a decoding method to take a digital watermark out of image data with the digital watermark embedded therein. The method includes the steps of: calculating a difference matrix between watermark-embedded data, which is obtained by transforming a color image with a digital watermark embedded therein into color signals in a YCbCr colorimetric system, that is, a luminance signal and color difference signals, and watermark-free data, which is obtained by transforming an original image without the digital watermark embedded therein into color signals in the YCbCr colorimetric system, that is, a luminance signal and color difference signals; decomposing the difference matrix into respective rows and calculating an arbitrary numerical value of real number x, which is supposed to represent the digital watermark information, with regard to each row; and estimating a mean of the numerical values of real number x calculated with regard to the respective rows as the digital watermark information.

This method enables the arbitrary numerical value of real number x, which represents the digital watermark information embedded in the luminance signal and the color difference signals, to be decoded with a high accuracy. The original image is required for decoding. Whether the color image with the digital watermark embedded therein is widely available, it is impossible to decode the digital watermark from only the available color image.

It is preferable that the arbitrary numerical value of real number x, which is supposed to represent the digital watermark information, is calculated on the premise that an absolute value of a difference between entries in each row of the difference matrix is within a predetermined range. This arrangement further enhances the accuracy of decoding the numerical value of real number x that represents the digital watermark. The significantly small absolute value diffuses the range of data and lowers the accuracy in estimation of the numerical value of real number x. The unnecessarily large absolute value, on the other hand, lowers the reliability while decreasing the number of data and making the estimated value approach the embedded value. It is accordingly preferable that the absolute value is in a range of 3 to 10.

The method of embedding the digital watermark and the method of decoding the embedded digital watermark may be attained in the form of a storage medium, in which a program of the corresponding method is stored. Typical examples of the storage medium include CD-ROMs, memory cards, and flexible disks. Such programs may be downloaded via a communication line. The method of embedding the digital watermark may be incorporated in a retouching software for processing image data integrally or as a plug-in software program. The embedding method and the decoding method may alternatively be actualized by independent programs for embedding the digital watermark and decoding the embedded digital watermark. The color images delivered as the digital contents often undergo compression by a diversity of compression techniques like JPEG. The programs of the methods may thus be incorporated in the image data compression software integrally or as plug-in software programs. The programs may integrally be incorporated in a scanner that reads printed image data as digital data or scanning software. The programs may also be incorporated in a printer driver and a printer that print digital data.

BEST MODES OF CARRYING OUT THE INVENTION

One mode of carrying out the present invention is discussed below as a preferred embodiment.

Principles of Embedding and Decoding Digital Watermark

Figure 1:
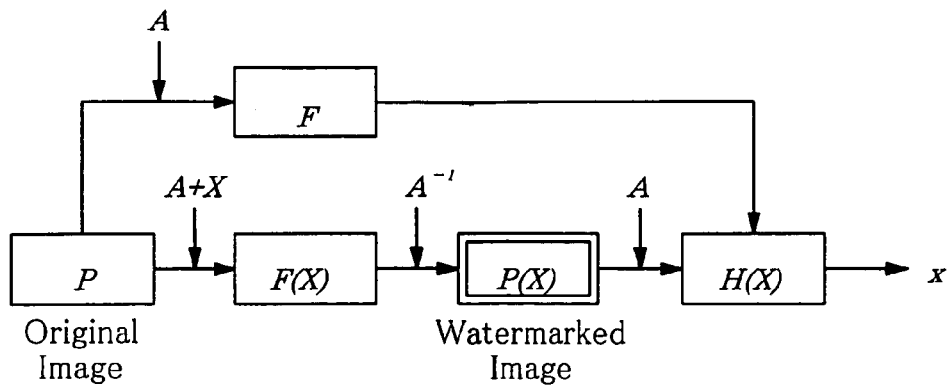
FIG. 1 shows the principles of methods of embedding and decoding a digital watermark in a embodiment of the present invention.

FIG. 1 shows the principles of a method of embedding a digital watermark in a digital color image and a method of decoding the embedded digital watermark in the embodiment. A digital color image or an original image expressed in an RGB colorimetric system is defined as a set of a large number of pixels arranged in a matrix specified by a horizontal resolution (hereinafter referred to as HSize) and a vertical resolution (hereinafter referred to as VSize). A color P' (where the mark ' denotes a matrix) of each pixel is defined as $P'=[r,g,b]^t$ (where the superscript t denotes a transposed matrix) using the densities of the respective color signals, red (r), green (g), and blue (b), which are the three primary colors of light, expressed by a predetermined resolving power (for example, 256 tones in a range of 0 to 255). One of the known systems for defining the color of each pixel other than the RGB calorimetric system is a YCbCr colorimetric system using a luminance signal and color difference signals. A color F' of each pixel in this calorimetric system is defined as $F'=[y,cb,cr]^t$.

These two colorimetric systems are not independent of each other, but are mutually transformable by a color signal transformation matrix A' and its inverse matrix $A^{-1}$ as shown in Equations (1) and (2) given below:

$$F'=A'P' \quad (1)$$

$$P'=A'^{-1}F' \quad (2)$$

where the matrix A' and the transposed matrix $A^{-t}$ in Equations (1) and (2) are specified as follows in this embodiment:

$$A' = \begin{bmatrix} 0.299 & 0.587 & 0.114 \\ -0.169 & -0.331 & 0.500 \\ 0.500 & -0.419 & -0.081 \end{bmatrix}$$

$$A^t = \begin{bmatrix} 1.000 & -0.001 & 1.402 \\ 1.000 & -0.344 & -0.714 \\ 1.000 & 1.772 & 0.001 \end{bmatrix}$$

The embodiment adopts the method that embeds digital watermark information x in the course of transforming a pixel P' in an original image expressed by the RGB colorimetric system into a pixel F' expressed by the YCbCr colorimetric system and inversely transforms the image with the embedded digital watermark information into the RGB calorimetric system.

One of the essential requirements in the process of embedding the digital watermark information is to minimize the deterioration of the picture quality by the embedded digital watermark. Here note the entries in the transformation matrix A'. The sum of the absolute values of the respective entries in each row is all equal to one. It is accordingly required to maintain the relationship that the sum of the absolute values of the respective entries in each row of the transformation matrix is all equal to one, in order to prevent the deterioration of the picture quality while transforming the pixel P' in the original image expressed by the RGB calorimetric system into the pixel F' expressed by the YCbCr colorimetric system. Namely it is desirable to keep the mutual relations of the entries in the course of embedding the digital watermark information in the transformation matrix A'. A watermark matrix X' given below is provided by taking into account such points:

$$X' = \begin{bmatrix} 0 & -x & x \\ x & 0 & -x \\ -x & x & 0 \end{bmatrix} \quad (3)$$

where x denotes watermark information and takes a numerical value of real number.

The procedure causes the color image to be subjected to digital watermarking with this watermark matrix X'. In other words, an arithmetic operation of Equation (4) is performed for a pixel of interest P':

$$F'(X)=(A'+X')P' \quad (4)$$

This arithmetic operation is carried out for all the pixels, so as to complete embedding the digital watermark. The resulting F'(X) signal is decoded according to Equation (5) given below with the inverse transformation matrix $A^{-1}$:

$$P'(X) = A^{-1}F'(X) = A^{-1}(A'P' + X'P') \quad (5)$$
$$= A^{-1}A'P' + A^{-1}X'P'$$
$$= P' + A^{-1}X'P'$$

Here P'(X) corresponds to an RGB color signal with the watermark information x embedded therein. As clearly understood from Equation (5), the pixel vector P'(X) is specified as the original signal P' with the noise $A^{-1}X'P'$, which includes the watermark information x, superposed thereon. FIGS. 2(a) through 2(d) show resulting images that have undergone the above transformation with various numerical values of real number x in a range of $-0.1 \leq x \leq 0.1$ as an example. The color slightly changes with a variation in value of the watermark information x. The luminance information is, however, well preserved, and the change of the color is continuous and gives no feeling of incompatibility as shown by the black and white images of FIGS. 2(a) through 2(d). The change of the color is extremely little and does not deteriorate the picture quality of the original color image. The numerical value of real number x may be out of this range but may be determined appropriately by taking account of the accuracy of calculation.

While the data of the RGB signal is an integral number, the transformed data of the YCbCr signal according to Equation (1) is a real number and thus requires rounding to an integral number in the course of the YCbCr to RGB inverse transformation. The process of inversely transforming according to Equation (2) and rounding to an integer may result in underflow where the resulting pixel value becomes negative or in overflow where the resulting pixel value exceeds an upper limit. In order to solve such problems, the technique of the embodiment carries out underflow correction and overflow correction. The correction sets zero to any negative pixel value and sets an upper limit value (for example, 255) of the bit expression to any pixel value exceeding the upper limit value.

The following describes a process of decoding the watermark information x from the image P'(X) with the digital watermark embedded therein according to the procedure discussed above. The data P' of the original image is required for decoding the digital watermark information x from the image P'(X).

Multiplying the image P'(X) by a known color signal transformation matrix A gives a matrix H' according to Equation $$H'(X) = A'P'(X) = A'(P' + A^{-1}X'P') \qquad (6)$$
$$= A'P' + A'A^{-1}X'P' = A'P' + X'P'$$

Here the signal F' obtained by transforming the original image with the matrix A' is subtracted from the matrix H'(X). The resulting difference is expressed by Equation (7) given below:

$$H'(X)-F'=(A'P'+X'P')-X'P' \qquad (7)$$

Where y1, y2, and y3 denote the signals of the difference XP, the matrix is rewritten as Equation (8) given below:

$$X'P' = \begin{bmatrix} y1 \\ y2 \\ y3 \end{bmatrix} = \begin{bmatrix} 0 & -x & x \\ x & 0 & -x \\ -x & x & 0 \end{bmatrix} \begin{bmatrix} r \\ g \\ b \end{bmatrix} \qquad (8)$$

Decomposing this equation specifies the respective entries as shown in Equations (9) given below. The value x is then calculated from these entries according to Equations (10) given below:

$$y1=bx-gx$$
$$y2=rx-bx$$
$$y3=gx-rx \qquad (9)$$
$$x1=y1/(b-g)$$
$$x2=y2/(r-b)$$
$$x3=y3/(g-r) \qquad (10)$$

In Equations (10), the denominator close to zero causes an arithmetic error in the calculation of the value x. There may also be some noise in the calculation. It is accordingly desirable to calculate the digital watermark information on the premise that the absolute value of each difference in Equations (10) is greater than a preset value (for example, 5). The significantly small absolute value diffuses the range of data and lowers the accuracy in estimation of the value x. The unnecessarily large absolute value, on the other hand, lowers the reliability while decreasing the number of data and making the estimated value approach the embedded value.

On the premise that this condition is fulfilled, the values (x1,x2,x3) are determined according to Equations (10), and the mean xav of these three values is calculated as:

$$xav=(x1+x2+x3)/3$$

The calculated value xav is specified as the estimated value of the watermark information x. The estimation of the watermark information x according to this procedure is carried out for each pixel. The value having the greatest statistical probability is eventually determined as the watermark information x.

Description of Algorithm of Embedding and Decoding Digital Watermark

Figure 3:
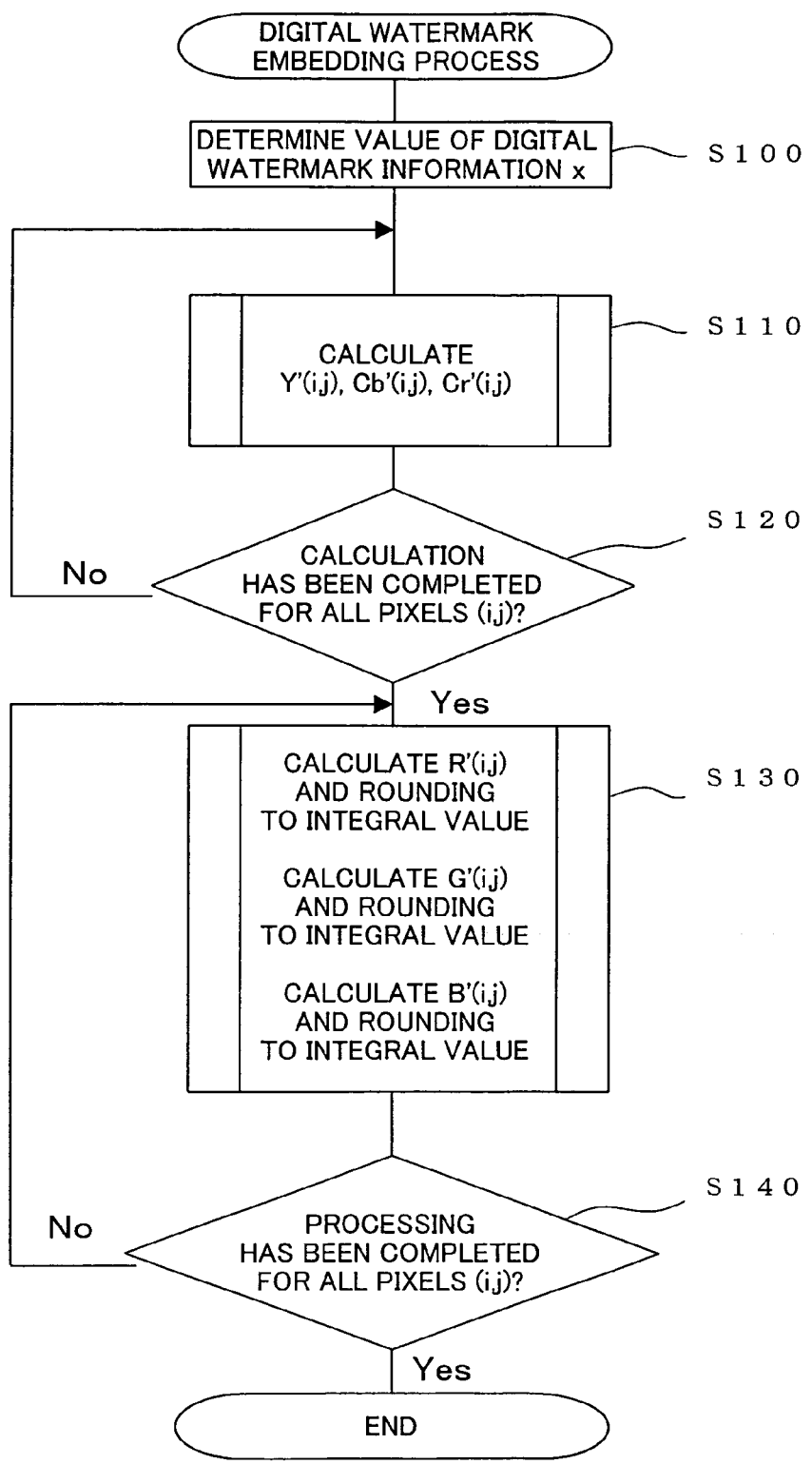
FIG. 3 is a flowchart showing a detailed algorithm of digital watermark embedding process.
Figure 4:
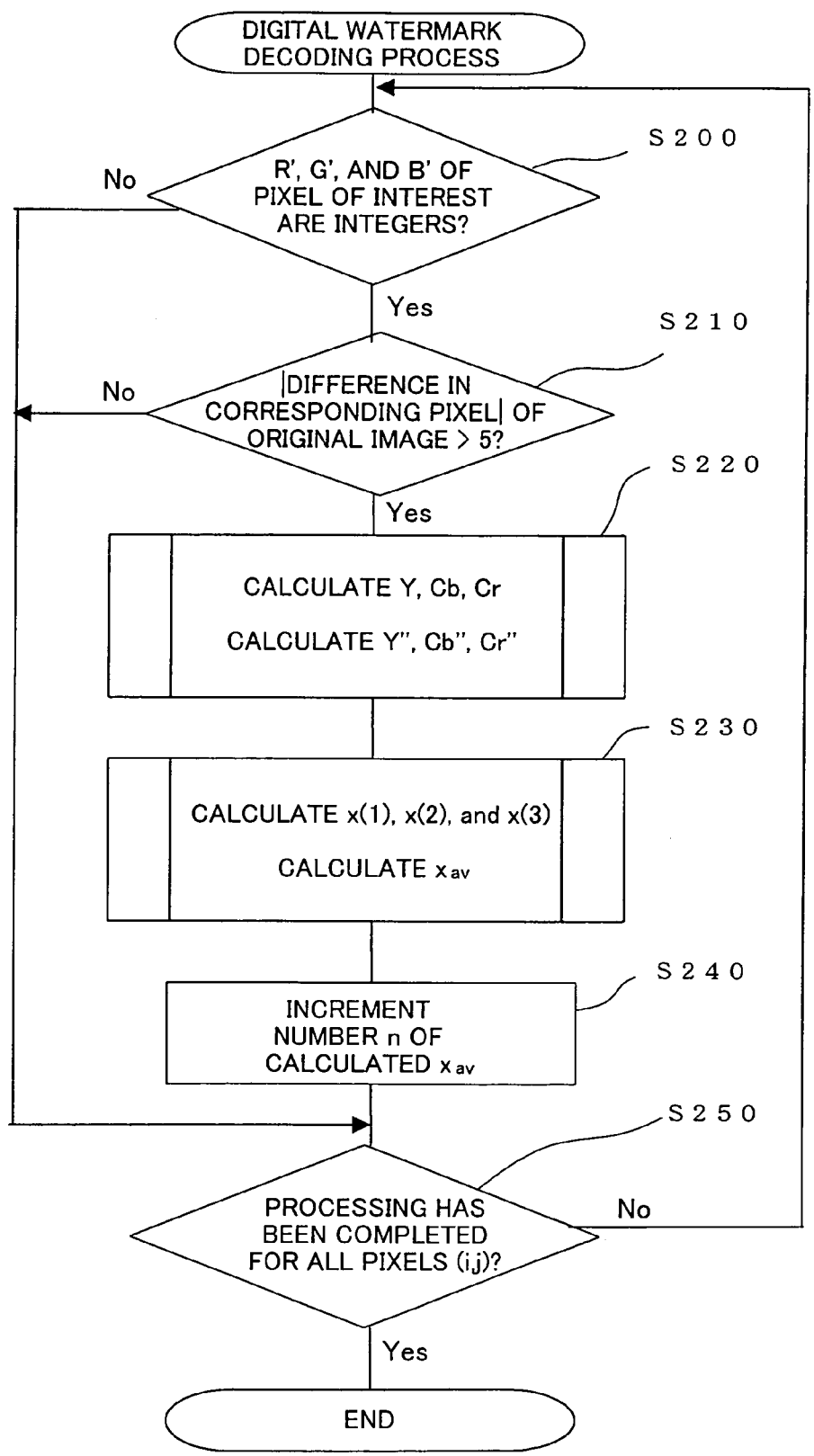
FIG. 4 is a flowchart showing a detailed algorithm of digital watermark decoding process.
Figure 5A:
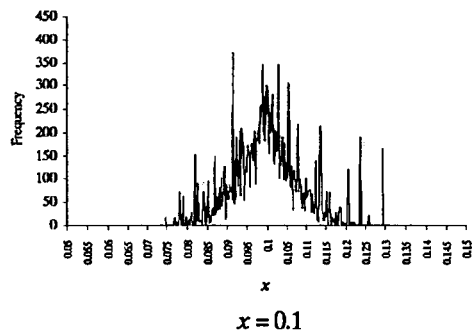
FIGS. 5(a) through 5(d) are histograms of the watermark information x estimated from the image with the watermark information x=0.1. x=0.05, x=−0.1, and x=−0.05 embedded therein.
Figure 5B:
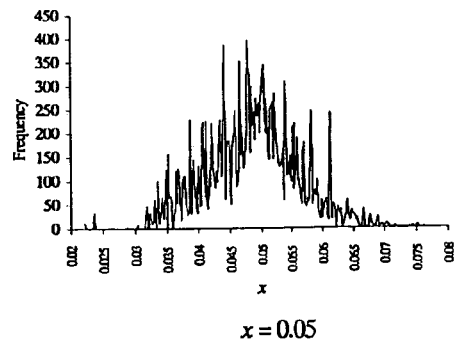
Figure 5C:
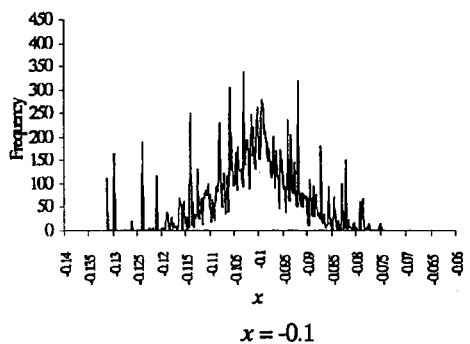
Figure 5D:
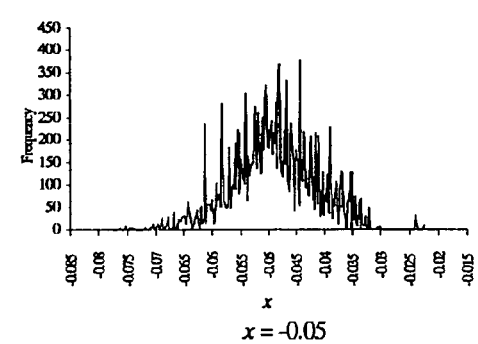

Concrete algorithms of the method of embedding a digital watermark in a color image and the method of decoding the embedded digital watermark carried out in the embodiment are described in detail with referring to the flowcharts of FIGS. 3 and 4.

The process of embedding the digital watermark is discussed first with the flowchart of FIG. 3. Density values of the R, G, and B signals of a set of pixels P (hereinafter may simply be referred to as the pixel) representing an original image are expressed as R(i,j), G(i,j), and B(i,j). Here i denotes an integer in a range of 1 to a dimension of the original image in the vertical direction (VSize), and j denotes an integer in a range of 1 to a dimension of the original image in the horizontal direction (HSize). The procedure first determines the value x, which represents the digital watermark information, and substitutes the value x into Equation (3) to specify a watermark matrix X' (step S100). The procedure then substitutes the watermark matrix X' into Equation (4) and transforms the set of pixels P' in the original image into a set of pixels F' in the YCbCr colorimetric system. The luminance signal and the color difference signals of the pixel F'(X) are expressed as Y'(i,j), Cb'(i,j), and Cr'(i,j), which are calculated according to Equations (11) through (13) given below:

$$Y'(i,j) \leftarrow R(i,j)*0.299+G(i,j)*(0.587-x)+B(i,j)*(0.114+x) \qquad (11)$$

$$Cb'(i,j) \leftarrow R(i,j)*(-0.169+x)-G(i,j)*0.331+B(i,j)*(0.5-x) \qquad (12)$$

$$Cr'(i,j) \leftarrow R(i,j)*(0.5-x)+G(i,j)*(-0.419+x)-B(i,j)*0.081 \qquad (13)$$

Transformation according to these Equations (11) through (13) is repeatedly carried out with regard to all the combinations of (i,j) (steps S110 and S120). This gives transformed data in the YCbCr colorimetric system representing an image with the digital watermark information x embedded therein.

The digital color image is generally expressed by the RGB calorimetric system, for example, on the computer. The procedure accordingly transforms the resulting F'(X) signal back to the RGB colorimetric system with the inverse transformation matrix $A^1$, and carries out the underflow correction or the overflow correction to make the value of each pixel integral (step S130).

Such correction is attained by the series of processing shown below. The procedure first calculates the R signal by the following calculation of the respective signals. When the obtained R signal is less than zero, the correction sets the value '0' to the R signal. When the obtained R signal is greater than 255, the correction sets the value '255' to the R signal. The similar series of processing is carried out with regard to the other color signals G, and B.

$$R'(i,j) \leftarrow Y'(i,j)*1.0-Cb'(i,j)*0.001+Cr'(i,j)*1.402$$

if R'(i,j)<0, then R'(i,j)←0
else if R'(i,j)>255, then R'(i,j)←255

$$G'(i,j) \leftarrow Y'(i,j)*1.0-Cb'(i,j)*0.344-Cr'(i,j)*0.714$$

if G'(i,j)<0, then G'(i,j)←0
else if G'(i,j)>255, then G'(i,j)←255

$$B'(i,j) \leftarrow Y'(i,j)*1.0+Cb'(i,j)*1.772+Cr'(i,j)*0.001$$

if B'(i,j)<0, then B'(i,j)←0
else if B'(i,j)>255, then B'(i,j)←255

The processing of step S130 is carried out repeatedly with regard to all the combinations of (i,j) (step S140). This gives the resulting data in the RGB colorimetric system that represents the image with the digital watermark information x embedded therein.

The following describes the process of decoding the digital watermark information x from the digital color image with the watermark information x embedded therein. One example of the decoding process is shown in the flowchart of FIG. 4. When the program enters this processing routine, the procedure first determines whether or not the values in the RGB calorimetric system are integers in the range of 1 to 254 as expressed below (step S200). This determines whether or not each pixel of interest has a sufficient reliability to be used for decoding the watermark information x. In the case where the value is equal to either 255 or 0, the overflow correction or the underflow correction carried out in the digital watermark embedding process discussed above may cause an overflow error or an underflow error.

If (R'(i,j), G'(i,j), or B'(i,j))=(0 or 255), else go to step S250

When the pixel of interest satisfies this condition, the procedure determines whether or not the other condition is fulfilled. Namely it is determined whether or not the absolute value of the difference in each corresponding pixel of the original image is greater than a predetermined value (5 in the algorithm of this embodiment) (step S210). The processing of this step is expressed as:

If the absolute value of (B(i,j)−G(i,j), R(i,j)−B(i,j), or G(i,j)−R(i,j))>5,
else go to step S250

The procedure carries out the conversion into the YCbCr colorimetric system according to equations given below with regard to the respective pixels of the original image as well as the respective pixels with the embedded digital watermark information that satisfy both the two conditions described above (step S220). Here Y, Cb, and Cr denote the luminance signal Y and the color difference signals Cb and Cr obtained by transforming the pixels of the original image into the YCbCr colorimetric system. Y", Cb", and Cr" denote the luminance signal Y and the color difference signals Cb and Cr obtained by transforming the pixels with the embedded digital watermark information x into the YCbCr colorimetric system.

$$Y(i,j) \leftarrow R(i,j)*0.299 + G(i,j)*0.587 + B(i,j)*0.114$$

$$Cb(i,j) \leftarrow -R(i,j)*0.169 - G(i,j)*0.331 + B(i,j)*0.5$$

$$Cr(i,j) \leftarrow R(i,j)*0.5 - G(i,j)*0.419 - B(i,j)*0.081$$

$$Y"(i,j) \leftarrow R'(i,j)*0.299 + G'(i,j)*0.587 + B'(i,j)*0.114$$

$$Cb"(i,j) \leftarrow -R'(i,j)*0.169 - G'(i,j)*0.331 + B'(i,j)*0.5$$

$$Cr"(i,j) \leftarrow R'(i,j)*0.5 - G'(i,j)*0.419 - B'(i,j)*0.081$$

After obtaining the values in the YCbCr colorimetric system converted from the pixels of the original image and the pixels with the embedded digital watermark information that assure certain accuracy, the procedure subsequently calculates values x(1), x(2), and x(3) from the obtained values in the YCbCr colorimetric system and then the mean xav of these three values, that is, the estimated value of the watermark information x, according to equations given below (step S230):

$$x(1) \leftarrow \{Y"(i,j) - Y(i,j)\} / \{B(i,j) - G(i,j)\}$$

$$x(2) \leftarrow \{Cb"(i,j) - Cb(i,j)\} / \{R(i,j) - B(i,j)\}$$

$$x(3) \leftarrow \{Cr"(i,j) - Cr(i,j)\} / \{G(i,j) - R(i,j)\}$$

$$xav \leftarrow \{x(1) + x(2) + x(3)\} / 3$$

When the mean value xav is obtained with regard to one pixel, the procedure counts up the value on a counter n, which counts the number of the mean values xav obtained (step S250). The above series of processing is repeatedly carried out with regard to all the pixels (i,j) (step S240).

EXPERIMENTAL EXAMPLES

Figure 2:
FIGS. 2(a) through 2(d) show digital color images with various values x embedded therein as digital watermark information according to the method of FIG. 1.
Figure 2:
Figure 2:
Figure 2:

The following results were obtained by an experiment that embedded the digital watermark information x in the color image (256×256 pixels, 256 tones in each of R, G, and B) shown in FIG. 2(a) according to the embedding technique discussed above.

After the embedding process with the specified watermark information x, the estimated value of x was obtained according to the decoding algorithm discussed above. The frequency of appearance of each estimated value x are shown in FIGS. 5(a) through 5(d). These clearly prove that the peaks of the histogram corresponding to each value of x accurately show the estimated values x. The greater absolute value of x is advantageous to decrease the estimation error in the course of decoding. As clearly understood from Equation (5) given above, however, the greater absolute value of x causes the severer deterioration of the picture quality. The extremely small absolute value of x, on the other hand, makes the estimation difficult. By taking account of these points, the desirable range of selection of the value x is from −1.0 to 1.0, more preferably from −0.5 to 0.5, and most preferably from −0.1 to 0.1. In order to facilitate the estimation of the value x, it is desirable to embed an identical value x in a greater number of pixels. The results of FIGS. 5(a) through 5(d) clearly show that the estimated value x concentrates on the vicinity of the embedded value x. The watermark information x is accordingly estimated without any significant error.

Although the experiment embedded one value of x into the whole frame, the number of the embedded value x is not restricted to one. For example, plural pieces of watermark information may be embedded in a digital color image consisting of a large number of pixels or a digital color image having a relatively monotonous variation in pixel data.

The following describes the evaluation results of resistance to the unexpected digital processing and the attacks of any third person against the digital color image with the digital watermark embedded therein. The description regards the experimental results of the digital color image with the embedded watermark information of x=0.1 that has undergone clipping, image compression (widely applied JPEG compression in this experiment), StirMark attacking, and overwriting.

(1) Clipping

Figure 6:
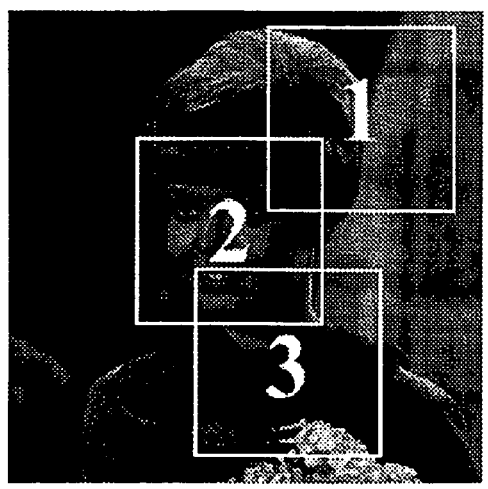
FIG. 6 shows an image with the watermark information x=0.1 embedded therein, which is subjected to various digital processing and attacks.
Figure 7:
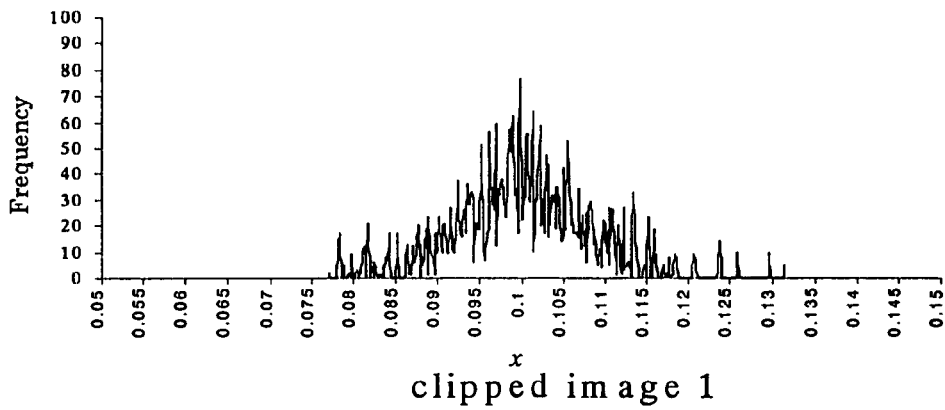
FIGS. 7(a), 7(b), and 7(c) are histograms of the value x decoded from clipped image data1, data2 and data3.
Figure 7:
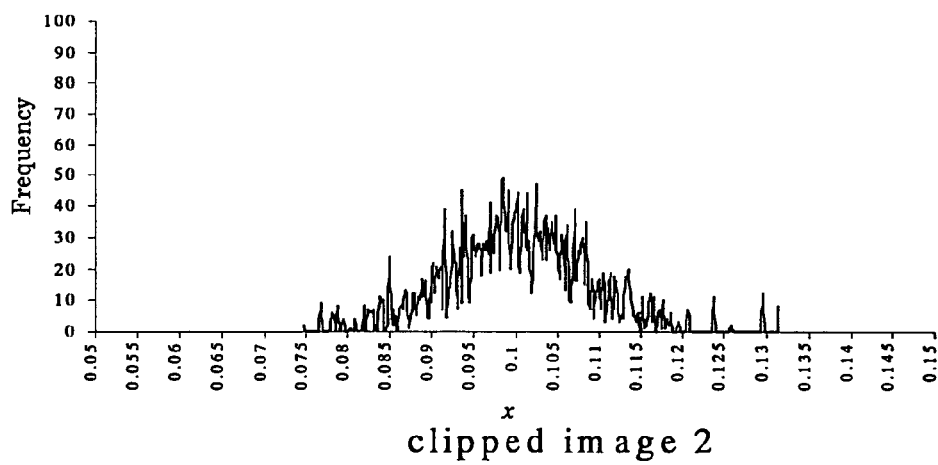
Figure 7:
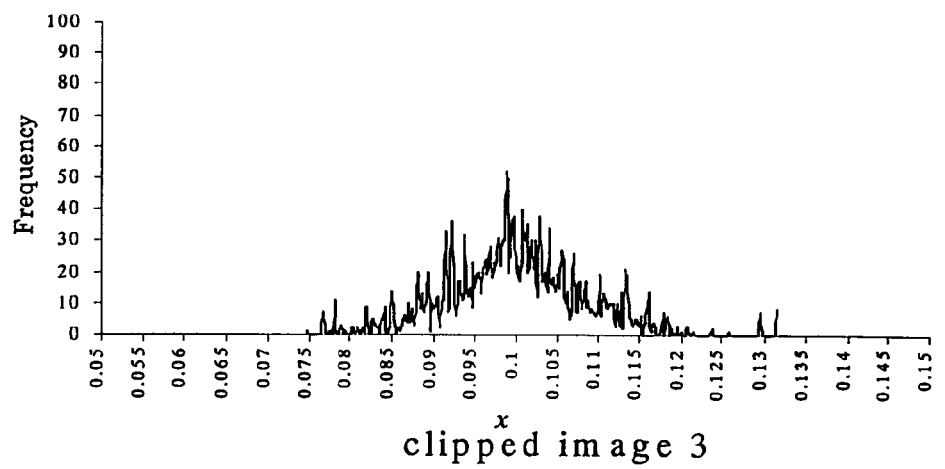

Image parts (100×100 pixels) of three areas (areas 1, 2, and 3) were clipped out of the image as shown in FIG. 6. The values x decoded from the respective clipped images according to the above algorithm are shown in FIGS. 7(a), 7(b), and 7(c). As clearly understood from FIGS. 7(a), 7(b), and 7(c), a clear peak is observed at x=0.1 in any clipped image having ⅓ of the pixels. Namely the digital watermark was decoded accurately. The technique of embedding and decoding the digital watermark according to the above algorithm enables the embedded digital watermark information x to be accurately decoded from even the clipped part of the available color image.

(2) JPEG Compression

Figure 8A:
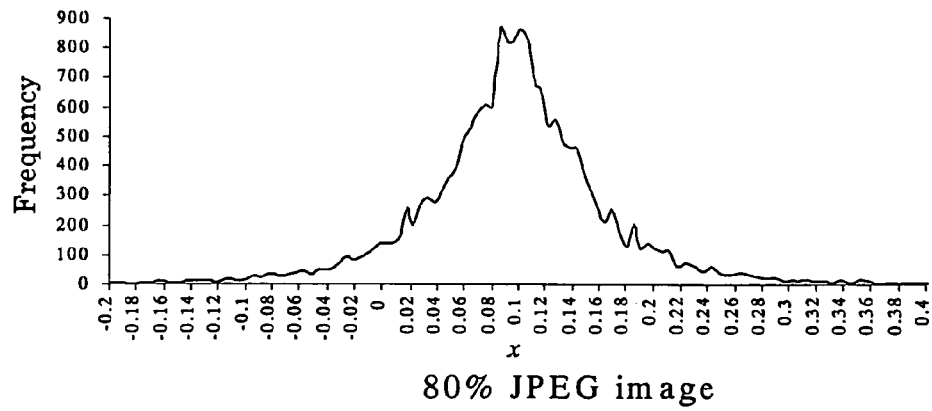
FIGS. 8(a), 8(b), and 8(c) are histograms of the value x decoded from compressed image data.
Figure 8B:
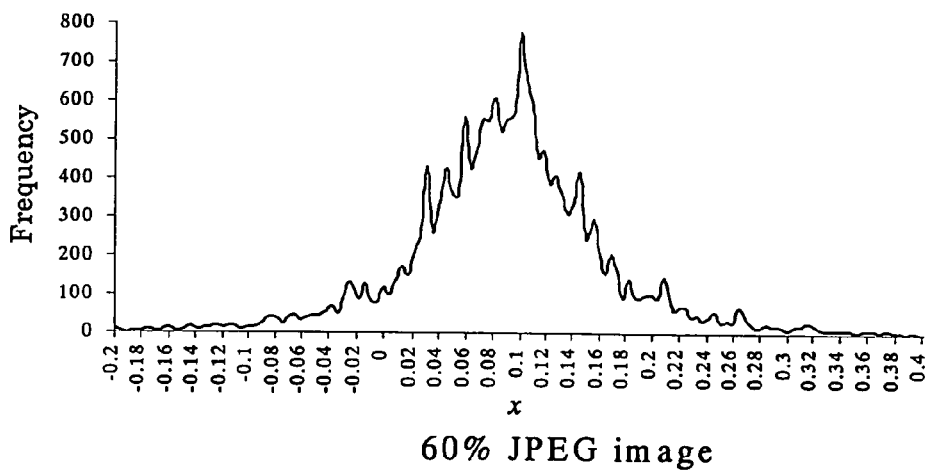
Figure 8C:
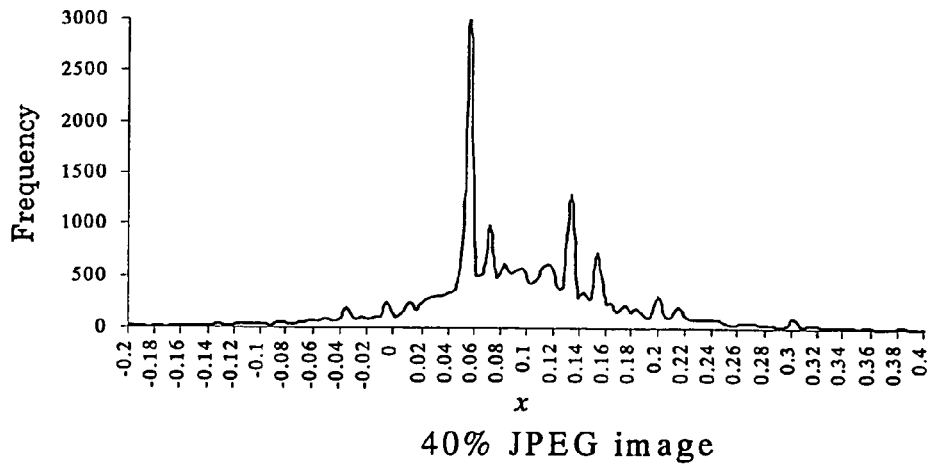

The digital image with the embedded digital watermark was subjected to JPEG compression. FIGS. 8(a), 8(b), and 8(c) show the estimated values of x from the JPEG compressed image data obtained by JPEG compressing the image of FIG. 6 at the compression rates of 80%, 60%, and 40%. As clearly understood from these results, at the compression rates of 80% to over 40%, the digital watermark information x is readily decoded from the JPEG compressed image data. At the compression rate of 40% or less, however, the deterioration of the picture quality is rather significant, and the practical use is restricted to extremely special cases. The technique of embedding and decoding the digital watermark according to the above algorithm is thus applicable for general color images.

(3) StirMark Attacking

Figure 9:
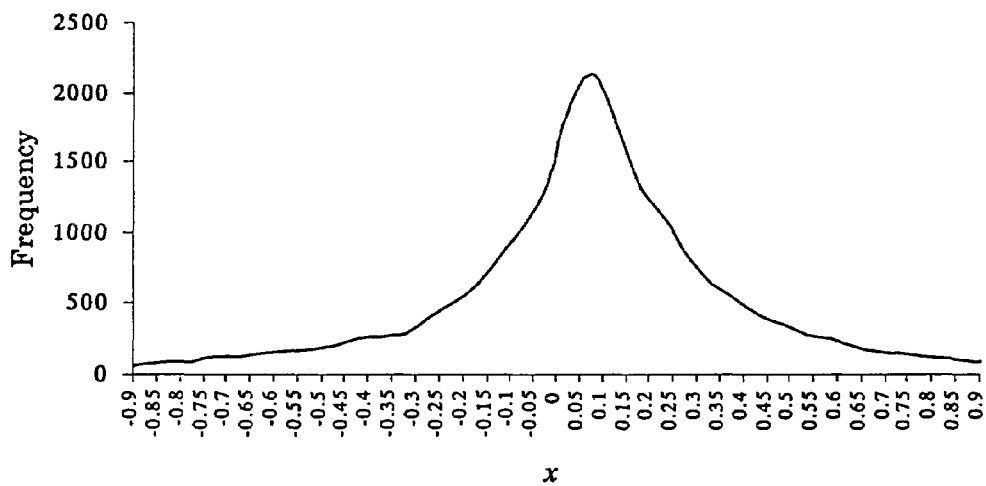
FIG. 9 is histogram of the value x decoded from image data exposed to StirMark attacking.

There is an attack upon the digital watermark called the StirMark attack and proposed by M. G. Kuhn. The image of FIG. 6 was subjected to this attacking tool StirMark. Here it is assumed that the respective parameters were set equal to default values. The technique of the embodiment enables the embedded digital watermark to be extracted from the digital color image that has undergone the attack on the digital watermark embedded in the digital color image. FIG. 9 shows the digital watermark decoded according to the algorithm discussed above. The result of FIG. 9 clearly proves that the digital watermark information x can be accurately estimated and that the digital watermarking according to the above algorithm has sufficient resistance to the StirMark attacking.

(4) Overwriting

Figure 10:
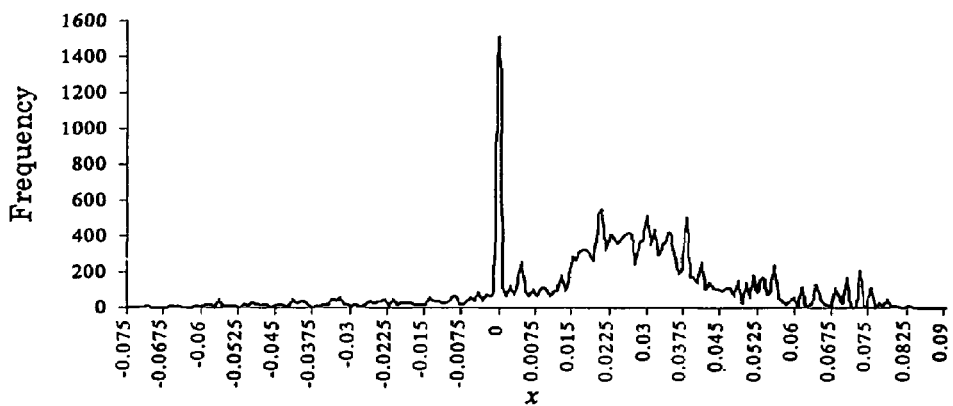
FIGS. 10(a) and 10(b) are histograms of the value x decoded from image data overwritten according to the identical algorithm.
Figure 10:
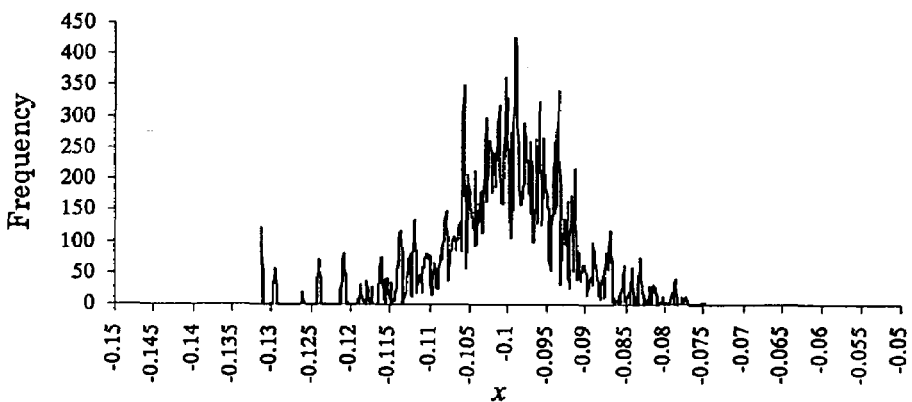

This experiment wrote another piece of digital watermark information $x2=-0.1$ ($\neq x1$) over the digital image with the embedded watermark information $x1=0.1$ shown in FIG. 6. FIG. 10($a$) shows the watermark information extracted from the overwritten image. In this example, a peak appears at $x=0$, which shows false watermark information. The procedure accordingly takes a difference between the overwritten image and the legal image with the embedded watermark information x and decodes the difference. This enables extraction of the illegally overwriting watermark information x2. The result is shown in FIG. 10($b$). The digital watermarking according to the above algorithm has sufficient resistance to the overwriting attack with another piece of watermark information, and enables extraction of the illegally overwriting watermark information x2.

(5) Affine Transformation

The digital watermarking technique of the embodiment embeds the watermark information in each pixel and is thus substantially free from any effects of various affine transformation processes.

General Structure of Apparatus

Figure 11:
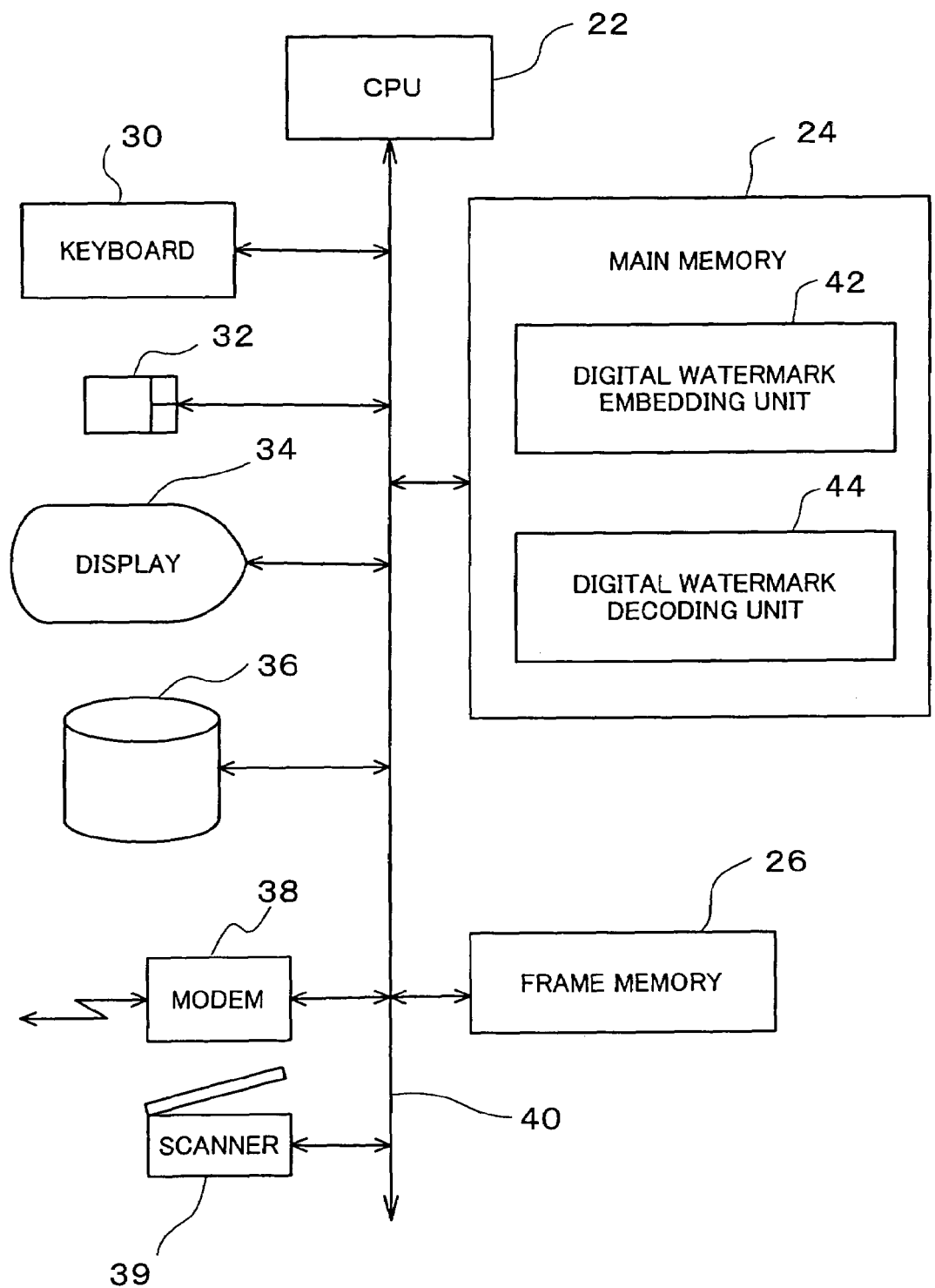
FIG. 11 is a block diagram schematically illustrating the structure of a digital watermark processor that carries out the digital watermark embedding process and the digital watermark decoding process in the embodiment.

The process of embedding a digital watermark in a color image and the process of decoding the embedded digital watermark are described above in the embodiment of the present invention. These processes are implemented by a digital watermark processor shown in FIG. 11. The digital watermark processor is constructed as a computer including a CPU 22, a main memory 24 including a ROM and a RAM, a frame memory 26, a keyboard 30, a mouse 32, a display unit 34, a hard disk 36, a modem 38, a scanner 39 that reads images, and a bus 40 that mutually connects the preceding elements. A diversity of interface circuits are omitted from the illustration of FIG. 11. The modem 38 is connected to a computer network via a non-illustrated communication line. A non-illustrated server on the computer network has the function as a program supply apparatus that supplies computer programs to an image processing apparatus via the communication line.

Computer programs for attaining the functions of a digital watermark embedding unit 42 and a digital watermark decoding unit 44 are stored in the main memory 24. The functions of the digital watermark embedding unit 42 and the digital watermark decoding unit 44 have already been discussed in detail.

The computer programs that attain the functions of the digital watermark embedding unit 42 and the digital watermark decoding unit 44 are provided in a specific form recorded in a computer readable recording medium, such as a flexible disk or a CD-ROM. The computer reads the computer programs from the recording medium and transfers the computer programs to either an internal storage device or an external storage device. Alternatively the computer programs may be supplied to the computer via the communication path. A microprocessor included in the computer executes the computer programs stored in the internal storage device to attain the functions specified by the computer programs. In accordance with an alternative procedure, the computer reads the computer programs recorded in the recording medium and directly executes the computer programs.

In the specification hereof, the term 'computer' expresses the concept including a hardware device and an operating system and thus represents the hardware device working under the control of the operating system. In the case where the operating system is not required but application software alone can activate the hardware device, the hardware device itself is equivalent to the computer. The hardware device includes at least a microprocessor like a CPU and means for reading the computer programs recorded in the recording medium. The computer programs include program codes that cause the computer to attain the functions of the respective units discussed previously. Part of the functions may be attained not by the application software but by the operating system. The programs for carrying out the digital watermark embedding process and the digital watermark decoding process may be added to image processing software in the form of plug-in software programs.

Typical examples of the 'recording medium' adopted in the present invention include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

The above embodiments are to be considered in all aspects as illustrative and not restrictive. There may be many modifications, changes, and alterations without departing from the scope or spirit of the main characteristics of the present invention.

INDUSTRIAL APPLICABILITY

The technique of the present invention is applicable for apparatuses of embedding watermark information in color images and apparatuses of electronic identification. The technique is effectively applied for embedding copyright information, for personal identification in the case of electronic transactions, and for cryptography that includes apparatuses and methods of encryption, transmission, and decryption.

What is claimed is:

1. A method of embedding digital watermark information in a color image, said method comprising the steps of:
   providing a color signal transformation matrix and an inverse color signal transformation matrix, the color signal transformation matrix transforming image data in a first colormetric system, which expresses a predetermined color space by a combination of plural parameters, into image data in a second colorimetric system, which expresses the predetermined color space by a combination of other plural parameters, the inverse color signal transformation matrix carrying out inverse of the transformation;

adjusting the color signal transformation matrix by either adding a digital watermark matrix to or subtracting a digital watermark matrix from the color signal transformation matrix, the digital watermark matrix including an arbitrary numerical value of real number x, which represents the digital watermark information, as an entry of the digital watermark matrix and satisfying a condition that a sum respective entries in each row and in each column is substantially equal to zero;

transforming the image data in the first colormetric system into image data in the second colormetric system with the adjusted color signal transformation matrix; and inversely transforming the resulting image data in the second colormetric system, which is obtained by the transformation, into the image data in the first colormetric system with the inverse color signal transformation matrix, so as to embed the digital watermark information into the color image.

2. An embedding method in accordance with claim 1, wherein either the first colormetric system or the second colormetric system is an RGB colormetric system using three primary colors of light as parameters, while the other colormetric system is a YCbCr colormetric system using a luminescence signal and color difference signals as parameters.

3. An embedding method in accordance with claim 1, wherein the arbitrary numerical value of real number x is an arbitrary value in a range not exceeding −0.1 and 0.1.

4. An embedding method in accordance with claim 2, said method further comprising the step of:

carrying out either an underflow correction or an overflow correction to cause an arbitrary pixel value to be an integer within a predetermined range in the process of inversely transforming the image data in the YCbCr colormetric system, which is obtained by the transformation with adjusted color signal transformation matrix, into the image data in the RGB colormetric system by means of the inverse color signal transformation matrix.

5. A decoding method to take a digital watermark out of image data with the digital watermark embedded therein, said method comprising the steps of:

calculating a difference matrix between watermark-embedded data, which is obtained by transforming a color image with a digital watermark embedded therein into color signals in a YCbCr colormetric system, that is, a luminescence signal and color difference signals, and watermark-free data, which is obtained by transforming an original image without the digital watermark embedded therein into color signals in the YCbCr colormetric system, that is, a luminescence signal and color difference signals;

decomposing the difference matrix into respective rows calculating an arbitrary numerical value of real number x, which is supposed to represent the digital watermark information, with regard to reach row; and estimating a mean of the numerical values of real number x calculated with regard to the respective rows as the digital watermark information.

6. A decoding method in accordance with claim 5, wherein the arbitrary numerical value of real number x, which is supposed to represent the digital watermark information, is calculated on the premise that an absolute value of a difference between entries in each row of the difference matrix is not less than a preset value.

7. A storage medium in which a program for embedding digital watermark information in a color image is stored in a computer readable manner, said program comprising:

a color signal transformation matrix that transforms image data in a first colormetric system, which expresses a predetermined color space by a combination of plural parameters, into image data in a second colormetric system, which expresses the predetermined color space by a combination of other plural parameters, and an inverse color signal transformation matrix that carries out inverse of the transformation;

the function of adjusting the color signal transformation matrix by either adding a digital watermark matrix to or subtracting a digital watermark matrix from the color signal transformation matrix, the digital watermark matrix including an arbitrary numerical value of real number x, which represents the digital watermark information, as an entry of the digital watermark matrix and satisfying a condition that a sum of respective entries in each row and in each column is substantially equal to zero;

the function of transforming the image data in the first colormetric system into image data in the second colormetric system with the adjusted color signal transformation matrix; and the function of inversely transforming the resulting image data in the second colormetric system, which is obtained by the transformation, into the image data in the first colormetric system with the inverse color signal transformation matrix, so as to embed the digital watermark information into the color image.

8. A storage medium in which a program for taking a digital watermark out of image data with the digital watermark embedded therein is stored in a computer readable manner, said program comprising the function of:

calculating a difference matrix between watermark-embedded data, which is obtained by transforming a color image with a digital watermark embedded therein into color signals in a YCbCr colormetric system, that is, a luminescence signal and color difference signals, and watermark-free data, which is obtained by transforming an original image without the digital watermark embedded therein into color signals in the YCbCr colormetric system, that is, a luminance signal and color difference signals;

decomposing the difference matrix into respective rows and calculating an arbitrary numerical value of real number x, which is supposed to represent the digital watermark information, with regard to each row; and estimating a mean of the numerical values of real number x calculated with regard to the respective rows as the digital watermark information.

* * * * *

UNITED STATES PATENT AND TRADEMARK OFFICE
CERTIFICATE OF CORRECTION

| | |
|---|---|
| PATENT NO. | : 6,973,195 B1 |
| APPLICATION NO. | : 09/830236 |
| DATED | : December 6, 2005 |
| INVENTOR(S) | : Kineo Matsui |

It is certified that error appears in the above-identified patent and that said Letters Patent is hereby corrected as shown below:

In the Title Page: col. 1

In line (54) change title "METHOD FOR EMBEDDING ELECTRONIC WATERMARK AND METHOD FOR DECODING THE SAME" to --METHOD OF EMBEDDING DIGITAL WATERMARK AND METHOD OF DECODING EMBEDDED DIGITAL WATERMARK--.

Column 2, line 22, change "calorimetric" to --colorimetric--.

Column 2, line 25-26, change "calorimetric" to --colorimetric--.

Column 2, line 34, change "calorimetric" to --colorimetric--.

Column 2, line 43, change "calorimetric" to --colorimetric--.

Column 2, line 46, change "calorimetric" to --colorimetric--.

Column 2, line 47, change "calorimetric" to --colorimetric--.

Column 5, line 7, change "calorimetric" to --colorimetric--.

Column 5, line 10, change "calorimetric" to --colorimetric--.

Column 5, line 43, change "calorimetric" to --colorimetric--.

Column 5, line 55, change "calorimetric" to --colorimetric--.

Column 8. line 35, change "calorimetric" to --colorimetric--.

Column 9, line 5, change "calorimetric" to --colorimetric--.

UNITED STATES PATENT AND TRADEMARK OFFICE
CERTIFICATE OF CORRECTION

| | |
|---|---|
| PATENT NO. | : 6,973,195 B1 |
| APPLICATION NO. | : 09/830236 |
| DATED | : December 6, 2005 |
| INVENTOR(S) | : Kineo Matsui |

It is certified that error appears in the above-identified patent and that said Letters Patent is hereby corrected as shown below:

In line 6 of claim 1 (column 12, line 66) change "colormetric" to --colorimetric--.

In line 20 of claim 1 (column 13, line 13) add --of-- after "sum".

In line 22 of claim 1 (column 13, line 15) change "colormetric" to --colorimetric--.

In line 23 of claim 1 (column 13, line 16) change "colormetric" to --colorimetric--.

In line 27 of claim 1 (column 13, line 20) change "colormetric" to --colorimetric--.

In line 28-29 of claim 1 (column 13, line 21-22) change "colormetric" to --colorimetric--.

In line 3 of claim 2 (column 13, line 27) change both instances of "colormetric" to --colorimetric--.

In line 5 of claim 2 (column 13, line 29) change both instances of "colormetric" to --colorimetric--.

In line 6 of claim 2 (column 13, line 30) change "luminescence" to --luminance--.

In line 7 of claim 4 (column 13, line 41) change "colormetric" to --colorimetric--.

In line 8 of claim 4 (column 13, line 42) add --the-- after "with".

In line 9 of claim 4 (column 13, line 43) change "colormetric" to --colorimetric--.

In line 8 of claim 5 (column 13, line 53) change "luminescence" to --luminance--.

In line 12 of claim 5 (column 13, line 57) change "luminescence" to --luminance--.

In line 15 of claim 5 (column 13, line 59) add --and-- before "calculating".

In line 17 of claim 5 (column 13, line 62) change "reach row" to --each row--.

In line 5 of claim 7 (column 14, line 12) change "colormetric" to --colorimetric--.

In line 7 of claim 7 (column 14, line 14) ) change "colormetric" to --colorimetric--.

In line 23 of claim 7 (column 14, line 31) change "colormetric" to --colorimetric--.

UNITED STATES PATENT AND TRADEMARK OFFICE
CERTIFICATE OF CORRECTION

PATENT NO. : 6,973,195 B1
APPLICATION NO. : 09/830236
DATED : December 6, 2005
INVENTOR(S) : Kineo Matsui It is certified that error appears in the above-identified patent and that said Letters Patent is hereby corrected as shown below:

In line 24 of claim 7 (column 14, line 32) change "colormetric" to --colorimetric--.

In line 27 of claim 7 (column 14, line 36) change "colormetric" to --colorimetric--.

In line 29 of claim 7 (column 14, line 38) change "colormetric" to --colorimetric--.

In line 4 of claim 8 (column 14, line 44) change "function of" to --functions of--.

In line 8 of claim 8 (column 14, line 50)) change "colormetric" to --colorimetric--.

In line 9 of claim 8 (column 14, line 50) change "luminescence" to --luminance--.

In line 12 of claim 8 (column 14, line 53) change "colormetric" to --colorimetric--.

Signed and Sealed this

Seventeenth Day of October, 2006

JON W. DUDAS
*Director of the United States Patent and Trademark Office*